United States Patent [19]  
New

[11] 4,061,438  
[45] Dec. 6, 1977

[54] BORING BARS
[75] Inventor: Ronald William New, Stoke Poges, England
[73] Assignee: National Research Development Corporation, London, England
[21] Appl. No.: 762,666
[22] Filed: Jan. 26, 1977
[30] Foreign Application Priority Data
Feb. 5, 1976 United Kingdom ................ 4600/76
[51] Int. Cl.² ........................................... B23B 47/00
[52] U.S. Cl. ................................................. 408/143
[58] Field of Search ....................... 408/143, 144, 714
[56] References Cited
U.S. PATENT DOCUMENTS

| 2,699,696 | 1/1955 | Hahn | 408/143 |
|---|---|---|---|
| 3,230,833 | 1/1966 | Shurtliff | 408/143 X |
| 3,559,512 | 2/1971 | Aggarwal | 408/143 |
| 3,598,498 | 8/1971 | Holmen | 408/143 |
| 3,642,378 | 2/1972 | Hahn et al. | 408/143 |
| 3,820,422 | 6/1974 | Rivin et al. | 408/143 X |
| 3,838,936 | 10/1974 | Andreassen et al. | 408/143 |
| 3,923,414 | 12/1975 | Hopkins | 408/143 |

Primary Examiner—Harrison L. Hinson  
Attorney, Agent, or Firm—Blanchard, Flynn, Thiel, Boutell & Tanis

[57] ABSTRACT

The overhung ratio of a boring bar having a damper formed by a damper mass located in a cavity near the cutting tool, with a fluid-filled clearance between the mass and the cavity wall, may be increased by shrink-fitting a tungsten carbide core or bung into the root end of the bar and/or by fitting a second damper to the free end of the bar beyond the cutting tool.

15 Claims, 10 Drawing Figures

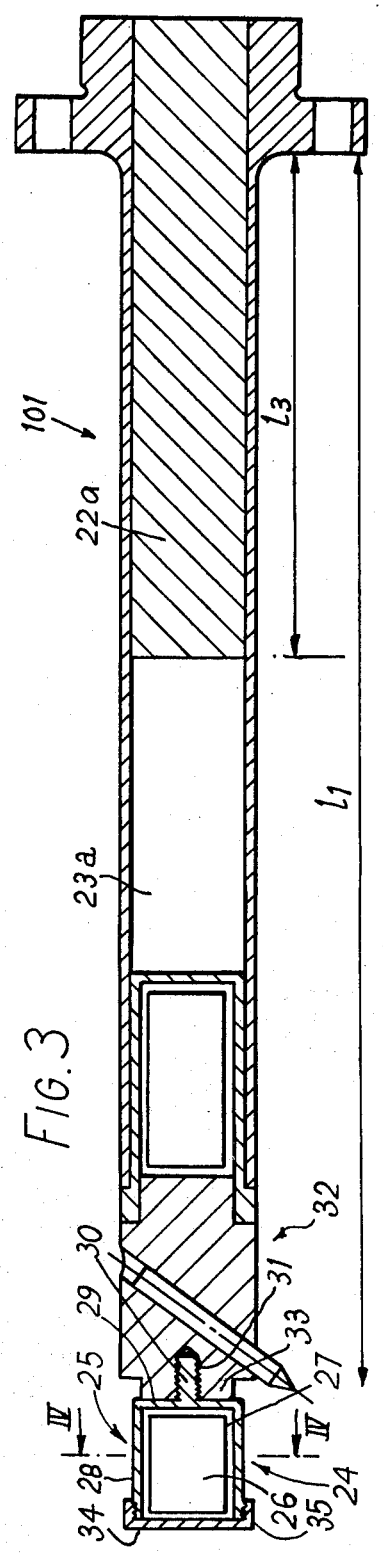

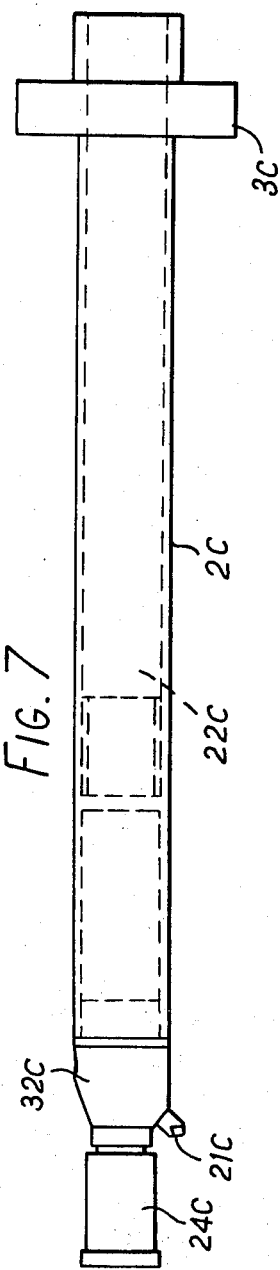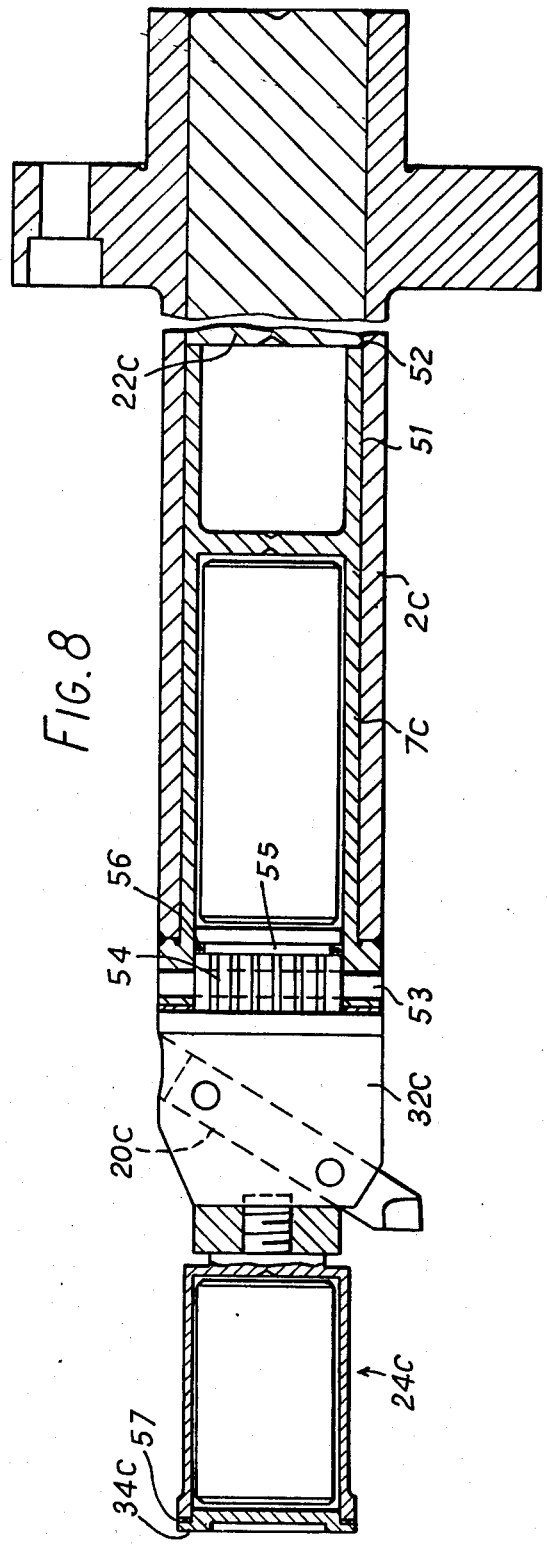

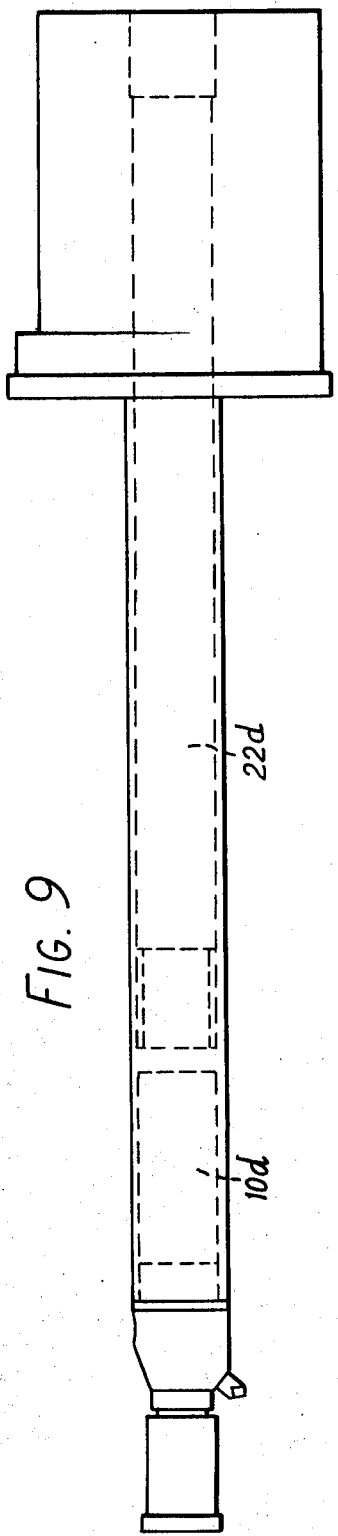
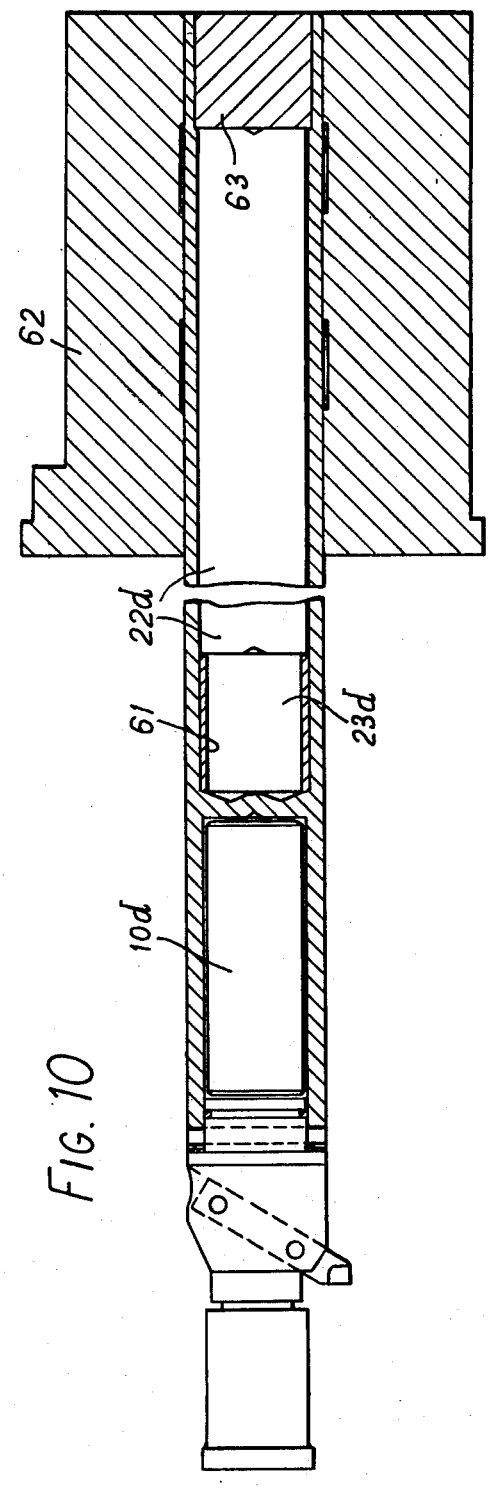

BORING BARS

BACKGROUND OF THE INVENTION

The present invention relates to overhung boring bars for accurately machining bores and in particular bores of non-uniform diameter along their length, for example stepped and tapered bores.

Problems arise in machining long bores since as the length of the boring bar is increased (for a given cross-section) the boring bar becomes increasingly prone to the build-up of chatter.

Thus conventional boring bars with diameters in the range 25 mm. to 40 mm. become unsatisfactory in this respect when their overhung ratio (i.e. ratio of the free length of the boring bar to its diameter) exceeds 5:1.

PRIOR ART

In one attempt to increase the acceptable maximum overhung ratio, a boring bar was constructed with a tungsten carbide shank, which has a modulus of elasticity about three times greater than steel thus giving a boring bar of much greater rigidity than the previously known steel ones. Such a construction is expensive and was found to increase the maximum overhung ratio to about 7:1. Furthermore, such a bar is brittle and thus fragile and so can only be expected to have a short life under practical machine-shop conditions.

Another arrangement is described by R. S. Hahn in a paper entitled "Design of Lanchester Damper for Elimination of metal-cutting chatter" (A.S.M.E., 1951 p. 331). This paper described the inclusion, in a boring bar and adjacent its forward end, of a cylindrical mass located, with a clearance, in a closed cavity within the bar. The clearance contains a gas such as air. Under vibratory conditions the assembly acted as a viscous-type Lanchester damper and if the clearance between the mass and the inner wall of the cavity was correctly chosen it successfully resisted the build-up of chatter in boring bars with overhung ratios up to about 7:1.

Further developments of boring bars including the damper proposed by Hahn are discussed in papers by Y. H. J. Au and R. W. New (Int. J. Prod. Res. 1974, Vol. 12, No. 2, 274–261) and K. W. Ng and R. W. New (read at 3rd International Conference on Production Research, Amherst, Mass., U.S.A., August 1975), both papers being published by Taylor & Francis Limited, 10–14, Macklin Street, London, WC2B 5NF, England. In particular, the developments include a shrink-fit or interference fit connection between an outer sleeve portion of the bar and a core portion (or bung) of the bar in the region adjacent the root of the bar, the shrink — or interference-fit being chosen to provide further damping which is apparently due to friction arising from very small relative movements between the sleeve and bung especially under medium and heavy cuts.

OBJECT OF THE INVENTION

The principal object of the invention is to provide a boring bar which can have an increased overhung ratio while having the same resistance to vibration and chatter.

BRIEF DESCRIPTION OF THE INVENTION

According to the present invention in one aspect there is provided a boring bar comprising a tubular shank having a rearward end by which it is mounted, the forward end having means for mounting a cutting tool, and a bung having a modulus of elasticity substantially greater than that of the shank, the bung being tight-fitted into at least the rear portion of the shank, the shank having adjacent the tool mounting means a closed cavity in which is positioned a damper means with a damping clearance between the mass and the inner wall of the cavity.

Preferably, the front end of the bung is spaced from the rearward end of the cavity by a hollow portion of the shank, thereby reducing the effective mass of the forward part of the bar without materially reducing the stiffness of the bar.

The bung need not be a homogeneous unit but may be constructed of a plurality of component parts such concenric tubes with a solid cylindrical core, the outer components preferably projecting further forwards than the inner component.

According to the present invention in another aspect there is provided a boring bar comprising a shank having a rearward end by which it is mounted, and a forward end having means for mounting a cutting tool, there being adjacent and behind the cutting tool a damper assembly consisting of a closed cavity in the bar in which is located a damper mass having a damping clearance around it, and forward of the cutting tool a second damper assembly which also consists of a closed cavity containing a damper mass surrounded by a damping clearance.

The second cavity, forward of the cutting tool, may be within a capsule which is detachable from the forward end of the bar in order that the second damper assembly may be removed should the boring bar be required to machine a bore, such a blind hole, which would otherwise be fouled by the capsule.

The bar may have a tubular shank with a bung tight-fitted into at least the rear portion of the tubular shank. Furthermore, the bung may then have a modulus of elasticity substantially greater than that of the tubular shank, in accordance with the first aspect of the invention.

Thus both aspects of the invention may be incorporated with advantage in the same boring bar.

Preferably, a portion of the shank adjacent the rear wall of the first cavity is hollow and tubular.

A plurality of tools may be fitted to the boring bars of the invention.

BRIEF DESCRIPTION OF THE DRAWINGS

Embodiments of the present invention will now be described by way of example with reference to the accompanying drawings, in which:

FIGS. 3 and 5 are views similar to FIG. 1 of other embodiments;

FIG. 4 is a cross-section on the line IV—IV of FIGS. 3 and 5.

FIGS. 7 and 9 are elevational views of two further boring bars according to the invention and FIGS. 8 and 10 show parts of longitudinal sections on an enlarged scale of the boring bars of FIGS. 7 and 9 respectively.

DESCRIPTION OF PREFERRED EMBODIMENTS

Figure 1:
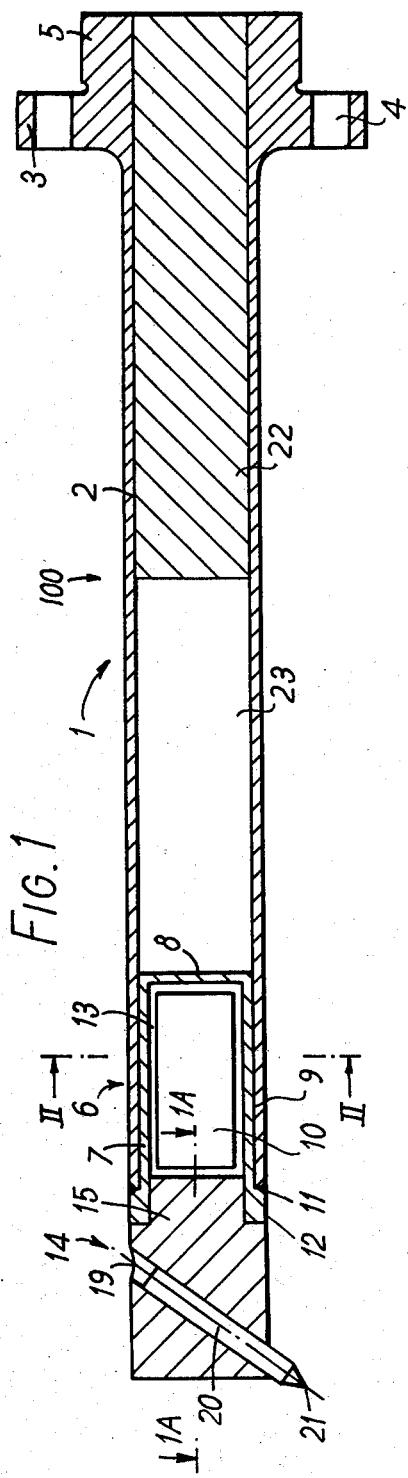
FIG. 1 is a longitudinal section of a boring bar.

FIG. 1 shows a boring bar 100 having a shank 1, which comprises a hollow cylindrical steel tube 2 with a diameter of 38 mm. carrying an annular mounting flange 3 which has bolt holes 4 (FIG. 2), the flange 3 being integral with the tube 2 and coaxial with both it and with a mounting spigot 5. The spigot 5 is adapted to fit snugly in a bore in a tool post (not shown) of a machine tool, with the flange 3 bolted tightly against a face of the tool post.

The tube 2 is made of En 9 or En 24 steel in *t* (heat-treated, hardened) condition.

A damper assembly 6 is located adjacent and behind the forward end of the bar and comprises a cylindrical sleeve 7 with an end wall 8 and a side wall 9 within which is located a cylindrical damper mass 10. The damper mass 10 is made of "Heavy Alloy" supplied by Osram G.E.C. Limited of East Lane, Wembley, Middlesex, England, and may for example be a tungsten-nickel-copper alloy having a density of 16.8 grams per c.c. or a tungsten-nickel-iron alloy having a density of about 18 grams per c.c. The damper mass 10 is 76.2 mm. long and has a diameter of 27 mm., with a clearance between the mass 10 and side wall 9 of about 0.10 to 0.13 mm. The actual choice of length and diameter of the damper mass is not critical but best results are attained with a clearance in the range 0.107 to 0.122 mm. for the bar shown in FIG. 1. With a clearance less than 0.107 mm., the performance deteriorates rapidly with reducing clearance but does not fall off so rapidly with clearances greater than 0.107 mm.

In all cases, however, of various bar dimensions, overhung ratios, and damper sizes, the optimum clearance is usually best determined by using vibration testing equipment to determine the various combinations which produce minimum response to vibratory forces.

The forward end of the sleeve is closed by a tool mounting (FIG. 1) in the form of a steel plug 14 having a reduced diameter portion 15 which fits inside the open end of the sleeve 7.

Figure 1A:
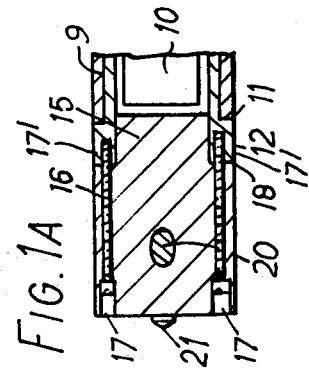
FIG. 1a shows a detail of the forward end of the bar of FIG. 1 on an enlarged scale.

The plug 14 is held in place by a ring of screws 16 (FIG. 1a) located in counter-bored holes 17 in the plug 14 and screwing into internally threaded holes 17' in the forward portion of the lip 12. A sealing washer 18 is compressed between the plug 14 and the forward open end of the sleeve 7 to prevent the ingress of moisture and oil. It is essential for satisfactory operation of the damper assembly 6 that the internal surfaces thereof should be clean and dry when it is assembled, and that subsequently no moisture or oil should enter the cavity. The plug 14 has a bore 19 in which a cutting tool 20, having a cutting tip 21 is clamped by conventional means.

A solid cylindrical tungsten carbide bung 22 (FIG. 1) is force-fitted inside the rear portion of the tube 2 leaving a hollow portion 23 in the tube 2, the bung being fitted so that it is most tightly held at its rearward end.

The space 23 between the forward end of the bung 22 and the damper assembly 6 reduces the effective mass of the boring bar 100 at its free end and thereby increases the effectiveness of the damper assembly 6. Although the space 23 has the effect of substantially reducing the effective mass of the boring bar at the free end, the bung 22 ensures that the boring bar is sufficiently stiff to maintain a good geometric form of bore. In addition to the damping of the damper assembly 6 further damping occurs at the interface of the forward part of the bung 22 and the tube 2, particularly with a heavy cutting load. A suitable interference or shunk-fit between the tube and the bung is obtained by making the bung diameter larger than the internal diameter of the sleeve by about 0.01 to 0.015 mm., and heating the tube to about 200° C. and inserting the bung and then allowing the tube to cool.

In general there is an optimum length for the bung 22; if the bung exceeds this length the effective meass of the forward part of the bar is increased thereby reducing the effectiveness of the damper assembly 6, while if the length of the bung 22 is less than the optimum length the static stiffness against lateral deflection is reduced, as is the frictional damping between the bung 22 and the tube 2. The bung 22 has a diameter of 30.2 mm. and extends for 0.5 to 0.6 times the overall effective bar length of 381 mm. The length of the bung extending forwards of the mounting flange is about 221 mm. The bung has however to be prolonged rearwardly for a length preferably not less than the diameter of the bar.

Tungsten carbide is the preferred material for the bung since its modulus of elasticity is about three times that of the tube. Other more economical materials may be used for the bung provided that the bung has a modulus of elasticity greater than that of the sleeve, although the improved performance may not be as good as with a tungsten carbide bung.

Figure 2:
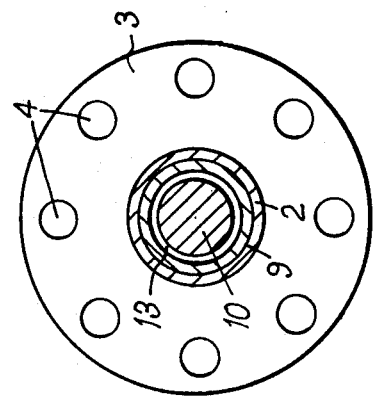
FIG. 2 is a cross-section on the line II—II of FIG. 1.

FIGS. 3 and 4 show a boring bar 101 which is similar to that shown in FIGS. 1 and 2, except that it has a second damper assembly 24 detachably fitted to the forward end of the boring bar, and the bung 22a may be of steel or tungsten carbide.

The second damper assembly 24 (FIG. 3) is detachable in order that it may be removed so as to allow the boring bar to be used to machine a bore, such as a blind hole, which would otherwise be fouled by the second damper assembly.

This damper assembly 24 consists of a cylindrical capsule 25 containing a cylindrical Heavy Alloy damping mass 26, the clearance 27 between the damping mass and the inner surface of the capsule being of the same order as that for the mass 10 and having an optimum value which may be determined by experiment and calculation. Preferably the mass 26 has a length of from one to one and a half times its diameter.

The capsule 25 has a cylindrical steel side wall 28 and a steel rearward end wall 29 integral with it, from which an externally screw-threaded spigot 30 projects rearwardly and axially to be located in an internally threaded hole 31 in the forward part of a steel plug 32.

The steel plug 32 is similar in design and function to the steel plug 14 of the boring bar 100 shown in FIG. 1 except that it has a reduced diameter portion 33 projecting forwardly in which the threaded hole 31 is drilled. When the capsule 25 is located in position its rearward surface abuts the forward surface of the steel plug 32.

The forward end of the capsule 25 is closed and sealed by a steel disc 34 having an internally threaded rim 35 extending rearwardly so as to surround the externally threaded forward portion of the side wall 28.

The damper assembly 24 is designed to assist the damper 6 in damping the primary mode of vibration of the boring bar, particularly when taking finishing cuts.

When taking heavy (roughing) and medium cuts in high duty steels (such as are used for gas turbine shafts), it is found that the boring bar may vibrate in a secondary mode at a frequency several times that of the primary frequency and with a mode in the central portion of the bar.

The second damper assembly 24 may be designed to have its maximum damping range effective to discourage this secondary mode. Since the second damper assembly is readily detachable, two alternative assemblies may be provided, one for the secondary mode for heavy and medium cuts and the other for the primary mode for light, finishing cuts.

FIG. 5 shows a boring bar 102 similar to that shown in FIGS. 3 and 4 except that this boring bar has a solid one-piece steel shank 36 with the forward end recessed to receive the damper assembly 10b.

The recessed portion of the shank 36 is of a length greater than the length of the damper assembly 10b, so as to leave a hollow tubular portion 23b between the damper assembly 10b and the solid part of the bar.

Figure 6:
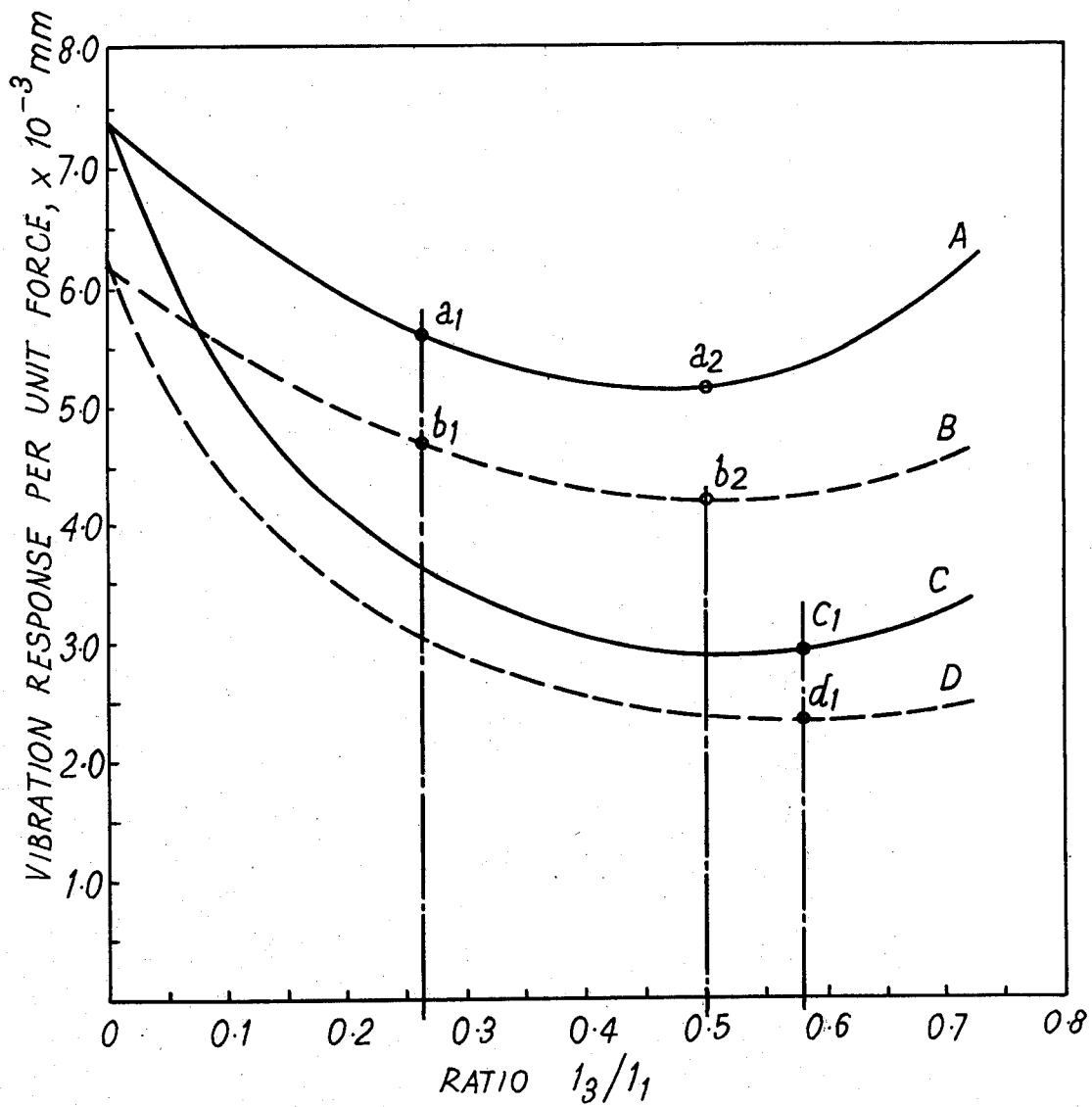
FIG. 6 is a graph showing the vibration response of the embodiments shown in FIGS. 1 to 4.

FIG. 6 is a graph showing computed curves of the ratio length of bung $l_3$ to overhung length of bar $l_1$ plotted against the vibration response in micrometers per unit force, for various boring bars having an overhung ratio of 10:1, the overhung length of the bars being 381 mm. and the diameter 38 mm. Curves A and B represent the response of a bar as shown in FIG. 3 but having a steel bung, curve A relating to a bar with the forward damper assembly removed, and curve B to a bar with two damper assemblies.

Tests were conducted with bung lengths of 0.26 and 0.5 of the overhung length of the bar and the results yielded points $a_1$, $a_2$, $b_1$ and $b_2$ on all of which lie on their respective curves A and B.

Curves C and D represent the calculated response of a bar as in FIG. 3 with one and two damper assemblies respectively and a tungsten carbide bung, tests having been performed with a bung length equal to 0.58 of the overhung length of the bar and yielding points $c_1$ and $d_1$.

For satisfactory performance of a boring bar in use, the vibration response per unit face, as plotted in FIG. 6, should be less than about 5.0 micrometers.

The graph clearly demonstrates that a boring bar with two damper assemblies gives a better respone than a bar with only one, and that a bar with a tungsten carbide bung is better than a bar with a steel one.

The boring bar shown in FIGS. 7 and 8 is of similar construction to that shown in FIGS. 3 and 4 but differs therefrom in that the sleeve 7c of the first damper assembly is extending by a skirt portion 51 the free edge 52 of which forms an abutment for precisely determining the position of the forward end of the bung 22c during the shrink-fitting stage of assembly of the bar.

The sleeve 7c is again a tight-fit in the forward end of the tube 2c and, welded to it.

Moreover, the plug 32c which forms a holder for the tool 20c is secured in the forward end of the sleeve 7c by means of a dowel pin 53 which passes through diametrically opposite holes in the forward end of the sleeve 7c and through a spigot portion 54 of the plug 32c. The spigot portion 54 has a groove 55 containing an O-ring 56 which seals the cavity containing the damper mass against the ingress of water, oil and other contaminants. Further rigidity and sealing-tightness are ensured by making the dowel pin 53 a drive-fit and by using an epoxy-resin or other sealing compound between the various surfaces. (The portion of 54 between the shoulder and groove 55 can be lightly serrated to ensure a better fit in the lip of 7c)

Similarly, the end cap 34c of the second damper assembly 24c may be sealed in place by means of a washer 57 and epoxy-resin.

As a further alternative, the spigot 54 may be screw-threaded for engagement with corresponding screw-threads in the sleeve 7c.

In the embodiments shown in FIGS. 9 and 10, the tubular shank of the bar is formed by drilling a solid bar from both ends. The major cavity for containing the bung 22d is formed by a deep drilling process using a self-piloting drill (for example by a gun-drilling process) in which the cutting head of the drilling bit is guided by the side wall of the hold it has just drilled.

In order to position the bung 22d accurately during the shrink-fit assembly process, a spacer tube 61 of thin-walled aluminum tubing or the like of length equal to that required for the cavity 23d is inserted into the deep-drilled hole prior to the insertion of the bung 22d. The tube 61 has negligible effect on the effective mass of the bar and only causes a very minor increase, if any, in the stiffness of the bar.

The exterior of the bar is cylindrical along the whole of its root portion and is secured in a conventional clamping collet 62 which enables the effective length of the boring bar to be adjusted to some extent, if required, merely by adjusting the axial position of the bar in its collet. It will be noted that the tungsten carbide bung 22d does not extend to the very end of the bar. Instead, a plug 63 of less expensive material is inserted into the end of the bar to withstand the radial clamping forces. This arrangement is effective since this end of the clamped portion of the bar does not have to have the stiffness required at the forward end of the clamped portion.

It will be readily apparent that the clamping collet method of fixing shown in FIGS. 9 and 10 may be applied to the other embodiments and that the clamping collet arrangement shown in FIGS. 9 and 10 could be replaced by the flange and spigot mounting shown for the other embodiments.

The forward end of the bar shown in FIGS. 9 and 10 is of the same construction as that shown in FIGS. 7 and 8. As in the case of the embodiments shown in FIGS. 7 and 8, various methods are available for securing the tool holder in the forward end of the tubular shank of the bar. Thus, the tool holder could be welded to the leading end of the tubular shank by an annular weld deposited in a V-shaped groove formed between the shank and the tool holder. With this method, a heat-resistant sealing ring would be required.

A further advantage of the boring bars as hereinbefore described is that they are effectively damped over a wide range of frequencies of vibrations, unlike some previously proposed boring bars which would only damp vibrations of a particular frequency to which they were "tuned". Although chatter is a resonance phenomenon, the frequency of chatter vibrations is not solely dependent on characteristics of the boring bar, but on several other factors as well, such as the cutting conditions and the material of the workpiece.

Examples of other materials which may be suitable for the bung are carbon fibre reinforced composite material, cast iron, brass, titanium or aluminum alloys.

The wall thickness of the tubular portion may vary between the bung and the first damper assembly, for example by decreasing towards the first damper assembly.

It will be appreciated that many changes could be made to the embodiments described above without departing from the scope of the invention.

I claim:

1. A boring bar comprising a tubular shank having a rearward end, by which it is mounted, and a forward end having means for mounting a cutting tool, a bung tight-fitted into at least a rear portion of the shank, said bung having a modulus of elasticity substantially greater than that of the shank, the shank having adjacent the tool mounting means a closed cavity in which is positioned a damper mass with a damping clearance between the mass and the inner wall of the cavity, said damping clearance containing a damping fluid.

2. A boring bar according to claim 1, in which the front end of the bung is spaced from the rearward end of the cavity by a hollow portion of the shank.

3. A boring bar according to claim 1, in which said damping fluid is air.

4. A boring bar according to claim 1, in which the bung is shrink-fitted into the hollow shank.

5. A boring bar according to claim 1 and including a second damper assembly, said cutting tool lying between said second damper assembly and the first mentioned damper assembly, said second damper assembly comprising a cylindrical damper mass located in a sealed cavity with a damping clearance between said mass and the inner wall of said cavity, said clearance containing a damping fluid.

6. A boring bar according to claim 5, in which said second damper assembly forms a capsule detachably secured to the forward end of said bar.

7. A boring bar according to claim 1, in which said bung is made of tungsten carbide.

8. A boring bar according to claim 7, in which said shank is made of steel.

9. A boring bar according to claim 8, in which said bung is shrink-fitted into said hollow shank.

10. A boring bar comprising a shank having a rearward end by which it is mounted, and a forward end having means for mounting a cutting tool, said bar including a first damper assembly adjacent and behind the cutting tool, said first damper assembly consisting of a closed cavity in the bar in which is located a damper mass having a damping clearance around it, said clearance containing a damping fluid, a second damper assembly forward of said cutting tool, said second damper assembly also consisting of a closed cavity containing a second damper mass circumferentially surrounded by a damping clearance containing a damping fluid.

11. A boring bar according to claim 10, in which said second damper assembly forms a capsule and said capsule is detachable secured to said bar.

12. A boring bar according to claim 10, in which said first and second damper masses and their respective cavities are cylindrical.

13. A boring bar according to claim 2, in which the forward end of said shank is open and said damper assembly is secured in said open shank end with said damper spaced from said bung.

14. A boring bar according to claim 12, in which said tool mounting means is secured to said damper assembly.

15. A boring bar according to claim 10, in which the second damper assembly is proportioned to damp the second mode of oscillation of the bar.

* * * * *